April 21, 1931.   R. M. LOVEJOY   1,802,028
VEHICLE SPRING CONSTRUCTION
Original Filed Jan. 6 1928
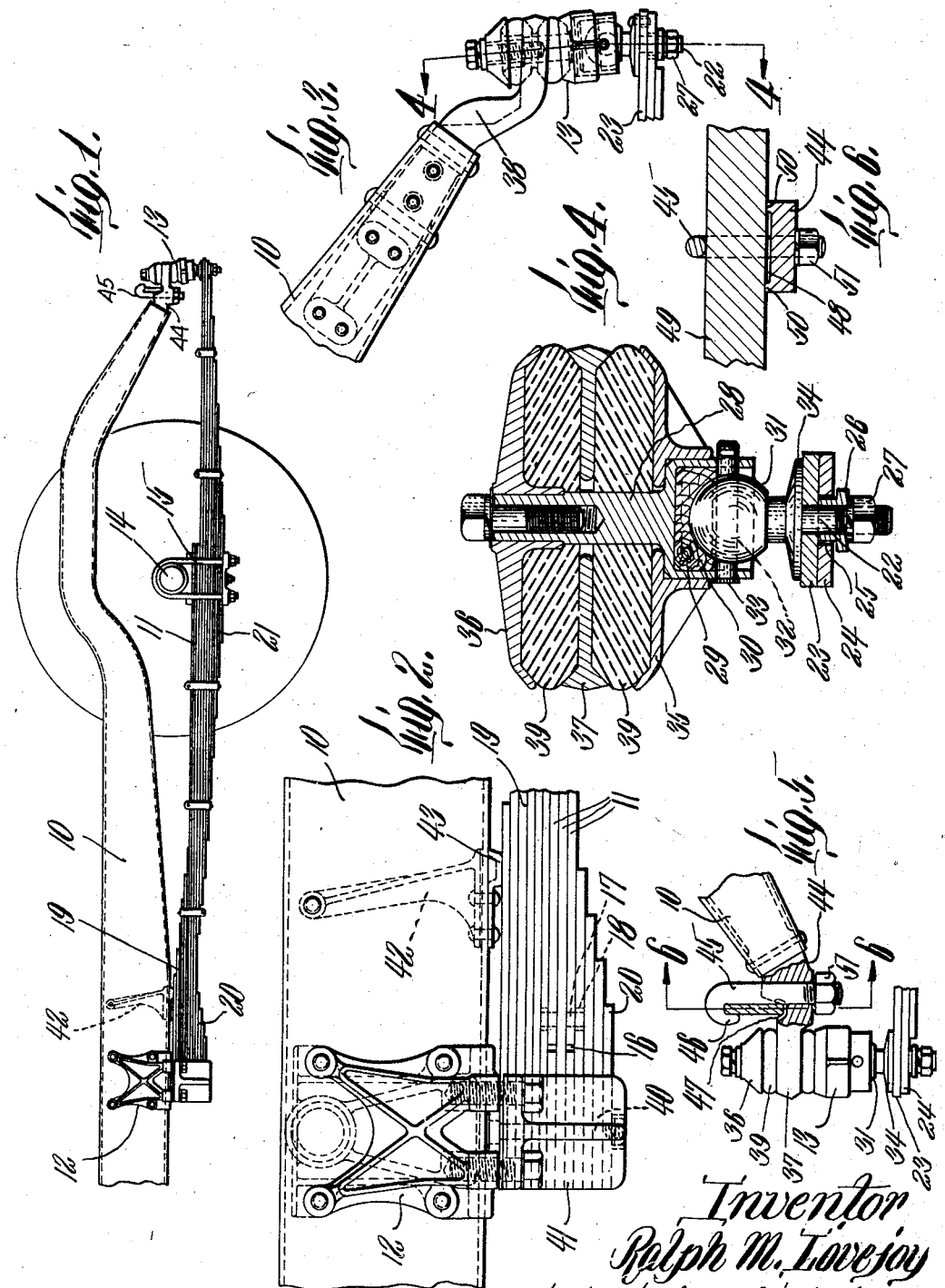
Inventor
Ralph M. Lovejoy Patented Apr. 21, 1931

1,802,028

UNITED STATES PATENT OFFICE

RALPH M. LOVEJOY, OF BOSTON, MASSACHUSETTS

VEHICLE SPRING CONSTRUCTION

Application filed January 6, 1928, Serial No. 244,887. Renewed September 6, 1930.

This invention relates to improvement in the construction of vehicle springs and the attachment thereof to the vehicle frame. The invention is more particularly illustrated as applied to automobiles. It is an object of the invention to provide a spring construction which will have the advantageous features disclosed in Letters Patent No. 1,480,624 granted to me January 15, 1924 and No. 1,649,835 granted to me November 22, 1927, and which in addition embodies further improved features tending to afford greater strength to the structure combined with more economical manufacture but without sacrifice of any of the desirable features inherent in previous structures.

It is furthermore an object of the invention to provide a multiple-leaf spring which has superior riding qualities by reason of novel features of construction, and which is securely clamped at one end to the vehicle frame and at an intermediate point to the axle housing, thus avoiding at these points the use of shackles which require oiling and are liable to wear quickly and to become noisy. In order also to avoid other oiling points, the portion of the spring between the clamps which secure it to the frame and axle housing respectively, is made of sufficient strength to resist the torque or rocking moment of the axle housing with respect to the frame which arises from the torque of the wheels when driven or the drag of the wheels when braked. It is essential for the good of the driving mechanism of the vehicle, that such torsional motion of an axle housing or tendency to rock relative to the frame be minimized. The torque may be opposed by the spring alone or by a rod extending from the axle and pivotally joined to the frame. The latter construction, however, adds weight to the vehicle and provides another oiling point. According to the present invention, a spring is provided that is sufficiently long to give the desired resilience and easy riding, but which is strong enough to resist the rocking tendency of the axle housing. For this purpose, it will be usually necessary to employ a plurality of leaves, the ends of which are clamped tightly at the vehicle axle and at one end of the spring as a whole. Since there must be relative sliding between these leaves when the spring is flexed, all these "torque leaves" except one are transversely broken, the breaks coming preferably close to the clamp or bolt which secures the end of the spring to the frame. As shown, the torque leaves terminate at one end near the axle and do not extend the full length of the spring. On account of the extra length of the spring as a whole, it is found usually advisable to let the frame bear not only on the end of the spring but also at a point spaced a few inches therefrom and further from the end than the breaks in the torque leaves. For this purpose, an abutment member may be provided to bear against the top of the spring without clamping the leaves at that point, as a clamp at this point would virtually shorten the effective spring and would nullify the effect of the breaks in the torque leaves.

Various additional advantageous features of construction will be apparent to one skilled in the art from the disclosure of the invention in the following description and on the drawing, of which,—

Figure 1 shows in side elevation a portion of an automobile frame having attached thereto mechanism embodying the invention.

Figure 2 is a detail on a larger scale of means for securing one end of the spring shown in Figure 1 to the frame.

Figure 3 is an elevation of the means for securing the other end of the spring to the frame.

Figure 4 is a section on the line 4—4 of Figure 3.

Figure 5 is a detailed elevation, a portion being broken away, showing means for securing a bumper to the frame.

Figure 6 is a section on the line 6—6 of Figure 5.

Referring to the drawing in detail, 10 represents a portion of a side member of an automobile frame, the portion illustrated being that to which the rear spring is secured. The spring itself as shown comprises a plurality of relatively long leaves 11 which may be called "torque leaves" since one of their functions is to oppose the torque impressed on the spring by the motion of the vehicle when brakes are applied to the rear wheels or when the wheels are driven by the motor. In the case of a front spring, these leaves oppose the torque impressed by the application of brakes to the front wheels. The spring as a whole may be secured to the frame 10 as by a bracket generally indicated at 12 and at the other end by a universal joint generally indicated as 13. Between its ends, the spring may be clamped to the axle 14 of the vehicle as by a suitable hanger 15. The leaves 11 instead of extending from one end of the spring to the other, are preferably made to extend from the bracket 12 to the hanger 15, being tightly clamped at their ends by both of these members. In order to permit interfacial sliding between the three torque leaves 11, the upper and lower leaves are preferably broken as at 16 adjacent to the bracket 12. Suitable pins 17 are fixed in the broken springs 11, these pins extending into suitable slots 18 formed in adjacent leaves to hold the leaves 11 in place and to hold the spring together as a whole in case of fracture of the middle torque leaf, but to permit a limited relative longitudinal motion. The structure of the spring will be described herein as that of a rear spring, it being understood that the features of structure are equally available for a front spring, the difference in practice between front and rear springs being merely a matter of overall length and reversal end for end. The forward portion of the torque leaves 11 are preferably overlaid by leaves 19 of progressively shorter length and are underlaid by short leaves 20, also progressively of shorter length. The number of leaves 19 and 20 may be varied according to the requirements of individual cases. The rear portion of the torque leaves 11 are underlaid by a plurality of leaves 21 which may be clamped at or near their mid portions together with the rear end portions of the leaves 11 by the hanger 15. The leaves 21 are preferably of progressively shorter length, the lowest being the shortest. The leaves 20 extend toward the leaves 21 but do not reach them. In order to provide ample strength at the rear end of the spring where it is secured to the universal joint 13, the upper two or more leaves of the group 21 are extended rearwardly beneath the joint 13. As shown in Figure 4, the joint 13 is provided with a bolt or rivet pin 22 projecting downwardly to extend through a suitable aperture in the end portion of the uppermost leaf 23 of the group 21. The end portion of the leaf or leaves 24 underlying the leaf 23 and coterminal therewith at the rear end is slotted at its end as at 25, this slot being sufficiently wide to receive in a loose fit a spacing collar 26, the upper end of which is adapted to bear against the lower surface of the leaf 23. When the pin 22 is inserted through the aperture in the leaf 23 and through the slot 25, the spacing collar 26 is slipped thereon and is clamped against the face of the leaf 23 as by a nut 27 or by riveting the pin 22. This construction results in the rear end of the frame 10 being directly supported by the end portions of two or more leaves such as 23, 24, but permits the necessary relative motion between the individual leaves when they are flexed in use.

The construction of the universal joint 13 is similar to that described in my Letters Patent hereinbefore referred to and may comprise a stem 28 having an enlarged hollow portion 29 at the lower end thereof in which is fitted a block 30 of oil-soaked wood or other equivalent material recessed to receive a ball member 31 from which the pin 22 projects downwardly. The weight of the vehicle ordinarily serves to maintain the block 30 in position on the ball 31. In order to hold the members together, however, in case of a high bounce or in case the vehicle overturns, the ball 31 may be laterally perforated as at 32, a pin 33 being provided to extend loosely through the perforation and to be supported by the side walls of the extension 29. Beneath the ball 31 and formed integrally therewith is a plate 34 which rests on the upper face of the leaf 23 and carries the thrust of the weight of the vehicle on the rear end of the spring. The stem 28 projects through a pair of laterally elongated plates 35, 36, between which is a plate 37 constituting the rear end portion of a goose-neck 38 which is permanently secured to the rear end of the frame 10. The plate 37 is spaced from the plates 35, 36 as by suitable pads 39 of resilient material such for example as rubber.

The forward end of the spring is composed of the forward ends of the torque leaves 11 and the upper leaves 19 and lower leaves 20. These leaves are all clamped securely at their forward ends as by a suitable bolt 40 extending downwardly from the bracket 12. Any other kind of suitable clamping or securing means may be employed if desired. Suitable side plates 41 are bolted or otherwise secured to the bracket 12 to maintain the superposed leaves in proper alinement. The bracket 12 as shown engages the spring over a comparatively small length of its end portion. In order to provide the requisite support for the downward thrust of the frame 10 against the forward end portion of the spring 11 and to avoid destructive moments of force which might otherwise be exerted by the comparatively long lever arm formed by the portion of the spring between the bracket 12 and the hanger 15, a suitable abutment member 42 may be provided having a portion 43 engaging the top of the spring at a point spaced from the forward end thereof. A combination of the short bracket 12 and the abutment member 42 gives the virtual effect of a long bracket equal in length to the distance between the forward end of the bracket 12 and the engaging portion 43 of the abutment member. These two members, however, are of considerably lighter construction than would be a bracket of such length, and are of equal strength and effectiveness in supporting the forward end of the spring. Furthermore, the abutment member 42 is necessarily situated at a point more remote from the bracket 12 than are the breaks in the spring leaves 11 so that a fulcrum point is provided at 43 which takes the weight of the vehicle in part but does not interfere with the mutual longitudinal motion between the leaves 11 when the springs are flexed. A bracket of equivalent length clamping such length of the spring would nullify the effect of the breaks in the leaves 11.

In Figures 5 and 6 a mounting for a front or rear bumper is shown in connection with the goose-neck 44 which projects from the frame 10. The goose-neck 44 is provided with a vertical bore to receive a suitable bolt 45 formed with a hook 46 on the end. The goose-neck 44 on its upper face is also suitably grooved as at 47, the mid portion of the groove being depressed as at 48, leaving the ends of the groove for contact with the lower edge of a bumper member 49 positioned therein. The hook 46 is adapted to fit over the upper edge of the bumper member 49 and to engage the upper edge at a point between the points of engagement 50 of the goose-neck 44 with the lower edge of the bumper. The bolt 45 may be provided with a suitable nut 51 by which the hook 46 may be drawn into clamping engagement with the bumper 49 to hold it firmly in fixed position. This method of clamping the ends of the bumper serves to stiffen the vehicle frame materially as the bumper thus virtually becomes an additional cross member of the frame.

Having thus described certain embodiments of this invention, it should be evident to those skilled in the art that various changes and modifications might be made therein without departing from its spirit or scope as defined by the appended claims.

I claim:—

1. A vehicle spring adapted to carry its load at the ends thereof and to be supported at a point intermediate of said ends, said spring comprising a continuous leaf extending from said intermediate point of support to one end of said spring, a plurality of short leaves of decreasing length above and below said continuous leaf extending from said end, and a plurality of leaves extending in both directions from said point of support and lapping said continuous leaf, said last mentioned leaves being of progressively shorter lengths with the longest leaf next to said continuous leaf, a plurality of these leaves extending to the end of the spring remote from said continuous leaf.

2. A vehicle spring adapted to carry its load at the ends thereof and to be supported at a point intermediate of said ends, said spring comprising a continuous leaf extending from said intermediate point of support to one end of said spring, a plurality of short leaves of decreasing length above and below said continuous leaf extending from said end, and a plurality of leaves extending in both directions from said point of support, the portions thereof on one side of said point partly underlying said continuous leaf, said last mentioned leaves being of varying lengths with the upper leaves longer than the lower, two of said upper leaves extending to the end of the spring remote from said continuous leaf.

3. In combination with a vehicle frame member and axle, a multi-leaf spring, an end support connecting an end of the frame member with an end of the spring, a bracket connecting the other end of said spring to an intermediate point of said frame member, and a hanger supporting and clamping said spring at a point intermediate of the ends thereof beneath the axle, said spring comprising three leaves extending from said bracket to said hanger and clamped at both ends thereby, the middle one of said three leaves being continuous, the other two having transverse breaks near the end held by said bracket, a plurality of short leaves clamped at one end by said bracket and extending beyond said breaks, some of said short leaves being above and some below said three leaves, and a plurality of leaves below said three leaves and clamped therewith by said hanger at points intermediate of the ends thereof, the upper two of said last mentioned leaves being attached to said end support, the lower being of progressively decreasing length.

4. A multi-leaf vehicle spring adapted to be secured at its ends to one member of the vehicle, and to another member of the vehicle at a point intermediate of the ends, said spring having an unbroken leaf and a contiguous broken leaf extending from one end of the spring to said intermediate point and clamped together at said end and point, a shorter leaf contiguous to said broken leaf and clamped therewith at said end, and means for permitting limited relative longitudinal movement between said shorter leaf and the portion of the broken leaf clamped at said intermediate point.

5. A multi-leaf vehicle spring adapted to be secured at its ends to one member of a vehicle, and to another member of the vehicle at a point intermediate of said ends, said spring having three superposed leaves extending from one end of the spring to said intermediate point and clamped together at said end and point, the upper and lower of the three leaves having transverse breaks near said ends, shorter leaves overlying and underlying said three leaves and extending from said end part way toward said intermediate point, said shorter leaves having slots therein at points remote from said end with respect to said breaks, and pins secured in said upper and lower leaves and projecting into said slots.

6. A multi-leaf vehicle spring adapted to be connected at both ends to the rear portion of a vehicle frame member and to be supported from an axle at a point intermediate of said ends, said spring having three leaves extending from the forward end of the spring to the intermediate point of support, the upper and lower of said leaves having transverse breaks near said end of the spring, shorter leaves overlying and underlying the three leaves and secured with the three leaves at their forward ends, said shorter leaves having slots therein to the rear of said breaks, and pins fixed in said upper and lower leaves engaging in said slots.

7. In combination with a vehicle frame member, a multi-leaf spring, and means connecting both ends of said spring to said frame member, said means comprising a universal joint mounted at an end of said frame member and having a portion projecting downwardly through the end portions of a plurality of the leaves of said spring, the upper one of said plurality of leaves having a perforation to receive said projecting portion of the joint, the rest of the plurality of leaves having a slot below said perforation and registering therewith, a spacer on said projecting portion fitting loosely in said slot, and means for clamping said spacer against said upper leaf.

8. In combination with a vehicle frame member, a goose-neck secured thereto and extending from an end thereof, said goose-neck having a transverse groove in the upper face thereof and a substantially vertical perforation therethrough, a bumper member, and a bolt extending through said perforation and formed with a hook at its upper end to receive an edge of said bumper member and to clamp said bumper member in said groove.

9. A vehicle spring adapted to carry its load at the ends thereof and to be supported at a point intermediate of said ends, said spring comprising a continuous leaf extending from said intermediate point of support to one end of said spring, a plurality of short leaves of decreasing length above and below said continuous leaf extending from said end, and a plurality of leaves extending in both directions from said point of support and lapping said continuous leaf, said last mentioned leaves being of progressively shorter lengths with the longest leaf next to said continuous leaf, at least one of these leaves extending to the end of the spring remote from said continuous leaf.

10. A vehicle spring adapted to carry its load at the ends thereof and to be supported at a point intermediate of said ends, said spring comprising a continuous leaf extending from said intermediate point of support to one end of said spring, a plurality of short leaves of decreasing length above said continuous leaf extending from said end, and a plurality of leaves extending in both directions from said point of support and lapping said continuous leaf, said last mentioned leaves being of progressively shorter lengths with the longest leaf next to said continuous leaf, at least one of these two leaves extending to the end of the spring remote from said continuous leaf.

11. In combination with a vehicle frame member, a multi-leaf spring connected at one end to an end of said frame member, a bracket clamping the other end of the spring to said frame at another point, means for supporting said spring at a point between the ends thereof, said spring including a long leaf extending from said bracket to a point beyond said supporting means and shorter leaves extending from said bracket toward said supporting means and superposed on said long leaf, and an abutment member mounted on said frame and engageable by the uppermost of said shorter leaves at a point spaced from said bracket.

12. A vehicle spring adapted to carry its load at the ends thereof and to be supported at a point between its ends, said spring comprising a leaf extending from one end of the spring to said point of support, and a second leaf extending from the opposite end of the spring and underlying the greater part of the first said leaf, and means clamping said leaves together at said point of support.

In testimony whereof I have affixed my signature.

RALPH M. LOVEJOY.